(12) United States Patent
Fujita et al.

(10) Patent No.: US 12,111,710 B2
(45) Date of Patent: Oct. 8, 2024

(54) POWER RECEIVING DEVICE, POWER FEEDING DEVICE, METHOD EXECUTED BY POWER RECEIVING DEVICE, METHOD EXECUTED BY POWER FEEDING DEVICE AND COMMUNICATION SYSTEM

(71) Applicant: Yamaha Corporation, Hamamatsu (JP)

(72) Inventors: Shogo Fujita, Hamamatsu (JP); Kosuke Onoyama, Hamamatsu (JP); Koji Onda, Hamamatsu (JP); Satoshi Miyagishima, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 94 days.

(21) Appl. No.: 17/991,327

(22) Filed: Nov. 21, 2022

(65) Prior Publication Data

US 2023/0161396 A1 May 25, 2023

(30) Foreign Application Priority Data

Nov. 24, 2021 (JP) ................ 2021-190306

(51) Int. Cl.
*G06F 1/28* (2006.01)
*G06F 1/26* (2006.01)
*H04L 12/10* (2006.01)
*H04L 12/40* (2006.01)

(52) U.S. Cl.
CPC ............... *G06F 1/28* (2013.01); *G06F 1/266* (2013.01); *H04L 12/10* (2013.01); *H04L 12/40045* (2013.01)

(58) Field of Classification Search
CPC .................... G06F 1/28; G06F 1/266
See application file for complete search history.

(56) References Cited

U.S. PATENT DOCUMENTS

2007/0283173 A1* 12/2007 Webb ............ H04L 12/10 713/300
2018/0233947 A1* 8/2018 Mills ............ H02J 9/06

FOREIGN PATENT DOCUMENTS

JP 2018-19433 A 2/2018

* cited by examiner

*Primary Examiner* — Stefan Stoynov
(74) *Attorney, Agent, or Firm* — Crowell & Moring LLP

(57) ABSTRACT

A power receiving device includes a connector configured to be connected to a power feeding device; a power source configured to receive a power supply from the power feeding device via the connector; and a controller configured to perform a predetermined process before a power supply stopping time in response to receiving a preliminary notification of power supply stopping from the power feeding device via the connector.

20 Claims, 7 Drawing Sheets

POWER RECEIVING DEVICE, POWER FEEDING DEVICE, METHOD EXECUTED BY POWER RECEIVING DEVICE, METHOD EXECUTED BY POWER FEEDING DEVICE AND COMMUNICATION SYSTEM

CROSS-REFERENCE TO RELATED APPLICATIONS

This application claims the benefit of priority to Japanese Patent Application No. 2021-190306, filed on Nov. 24, 2021, the entire contents of which are incorporated herein by reference.

FIELD

The present disclosure relates to a power receiving device, a power feeding device, a method executed by the power receiving device, a method executed by the power feeding device, and a communication system.

BACKGROUND

Conventionally, as a power supply method for supplying power to a communication device that transmits and receives packet data, a PoE (Power over Ethernet (registered trademark)) technology defined as a standardization technology in IEEE (Institute of Electrical and Electronics Engineers) 802.3af, IEEE802.3at, or the like has been used. For example, Japanese Patent Application Laid-Open Publication No. 2018-019433 discloses a router that communicates with a PoE-capable device and supplies power to the PoE-capable device via a LAN cable.

SUMMARY

According to an embodiment of the present disclosure, there is provided a power receiving device comprising: a connector configured to be connected to a power feeding device; a power source configured to receive a power supply from the power feeding device via the connector; and a controller configured to perform a predetermined process before a power supply stopping time in response to receiving a preliminary notification of power supply stopping from the power feeding device via the connector.

According to an embodiment of the present disclosure, there is provided a power feeding device comprising: one or more connectors configured to be connected to one or more power receiving devices; a power supplier configured to supply power to the one or more power receiving devices via the one or more connectors; a notifier configured to notify a predetermined power receiving device via the one or more connectors of the preliminary notification of power supply stopping; and a controller configured to stop supplying power from the power supplier to the predetermined power receiving device after a predetermined period of time has passed after notifying the predetermined power receiving device of the preliminary notification of power supply stopping by the notifier.

According to an embodiment of the present disclosure, there is provided a communication system comprising: one or more power receiving devices; and a power feeding device connected to the one or more power receiving devices, wherein, the one or more power receiving devices comprises: a first connector configured to be connected to the power feeding device; a power source configured to receive a power supply from the power feeding device via the first connector; and a controller configured to perform a predetermined process before a power supply stopping time in response to receiving a preliminary notification of power supply stopping from the power feeding device via the connector, and the power feeding device comprises: one or more second connectors configured to be connected to the one or more power receiving devices; a power supplier configured to supply power to the one or more power receiving devices via the second connector, a notifier configured to notify a predetermined power receiving device via the one or more second connectors of a preliminary notification of power supply stopping; and a controller configured to stop supplying power from the power supplier to the predetermined power receiving device after a predetermined period of time has passed after the notifying the predetermined power receiving device of the preliminary notification of power supply stopping by the notifier.

According to an embodiment of the present disclosure, there is provided a method executed by a power receiving device, the power receiving device comprising a connector configured to be connected to a power feeding device, a power source configured to receive a power supply from the power feeding device via the connector and a controller configured to receive a preliminary notification of power supply stopping from the power feeding device via the connector, the method comprising: performing a predetermined process before a power supply stopping time in response to the controller receiving the preliminary notification of power supply stopping.

According to an embodiment of the present disclosure, there is provided a method executed by a power feeding device, the power feeding device comprising one or more connectors configured to be connected to one or more power receiving devices, and a power supplier configured to supply power to the one or more power receiving devices via the one or more connectors, the method comprising: notifying a predetermined power receiving device via the one or more connectors of a preliminary notification of power supply stopping; and stopping supplying power from the power supplier to the predetermined power receiving device after a predetermined period of time has passed after notifying the predetermined power receiving device of the preliminary notification of power supply stopping.

DESCRIPTION OF EMBODIMENTS

Figure 1:
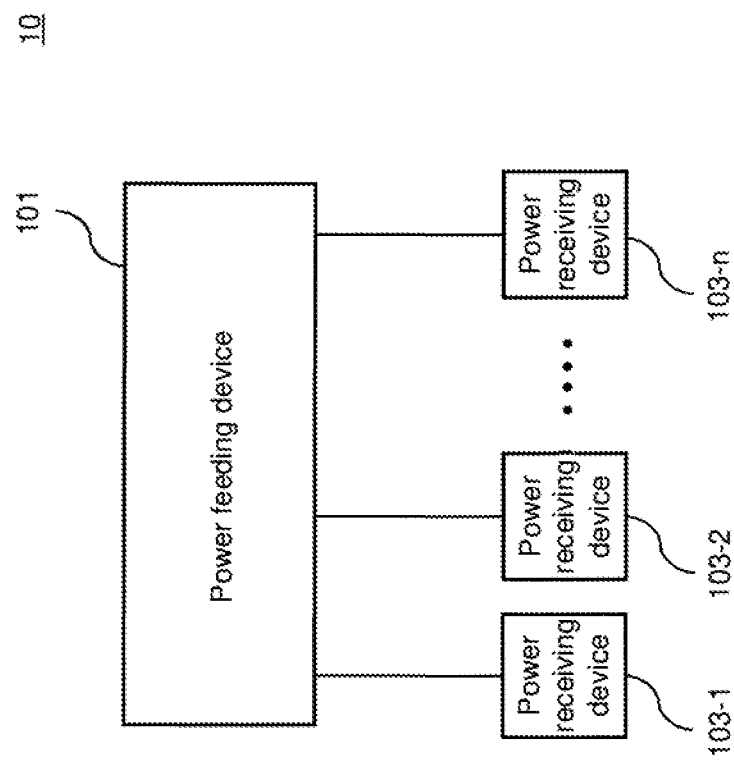
FIG. 1 is a schematic diagram illustrating a configuration example of a communication system according to an embodiment of the present disclosure.

A power feeding device such as a router starts/stops power supply for each port based on a preset power supply schedule, and can control a power source of a power receiving device, which is a PoE-capable device. However, in a case where the power feeding device stops the power supply to the power receiving device at a timing set according to a schedule without notification, there is a possibility that a storage of logs such as system logs that are in operation in the power receiving device is not in time and the unsaved logs disappear.

According to the present disclosure, it is possible to provide the power receiving device with the notification of power supply stopping in advance from the power feeding device, and to execute necessary process in the power receiving device before the power supply stops.

Hereinafter, embodiments of the present disclosure will be described with reference to drawings and the like. However, the present disclosure can be implemented in many different embodiments, and should not be construed as being limited to the description of the embodiments exemplified below.

The drawings may be schematically represented for clarity of explanation, but are merely examples, and do not limit the interpretation of the present invention. Further, the letters "first" and "second" for each element are convenience labels used to distinguish each element, and do not have any further meaning unless otherwise described. In the drawings referred to in the embodiments described below, the same or similar components having the same or similar functions are denoted by the same reference numerals or similar reference numerals (numerals denoted by A, B, 1, 2, or the like on a number XXX), and repeated description thereof may be omitted. In addition, a part of configurations may be omitted from the drawings. In addition, no particular explanation shall be given if the present invention pertains is recognizable for the person ordinarily knowledgeable in the field.

First Embodiment

<Communication System>

A communication system according to a first embodiment of the present disclosure will be described in detail with reference to the drawings.

FIG. 1 is a schematic diagram illustrating a configuration example of a communication system 10 according to a first embodiment of the present disclosure. The communication device 10 includes a power feeding device 101 and power receiving devices 103-1~103-n (n is a natural number). In the following description, each of the power receiving devices is simply referred to as a "power receiving device 103" when there is no need to distinguish between them.

The power feeding device 101 is a PoE-capable PSE (Power Sourcing Equipment). The power feeding device 101 is, for example, a power supply switching hub, a power supply adapter, or the like. In the present embodiment, an example in which the power feeding device 101 is a layer 2 (L2) switch is described.

The power receiving device 103 is a PoE-capable PD (Powered Device). The power receiving device 103 is, for example, an IP camera, an access point (AP), an IP telephone, a microphone, or the like. In the present embodiment, an example in which the power receiving device 103 is an AP is described. The power receiving device 103 is connected to the power feeding device 101 via a PoE-capable LAN cable. The power receiving device 103 performs data communication with the power feeding device 101, which is the L2 switch, and receives power from the power feeding device 101.

As the LAN cable for connecting the power feeding device 101 and the power receiving device 103, the PoE-capable LAN cable can be used. The power feeding method may be either an Alternative A mode, an Alternative B mode, or a four-pair PoE.

<Power Feeding Device>

Figure 2:
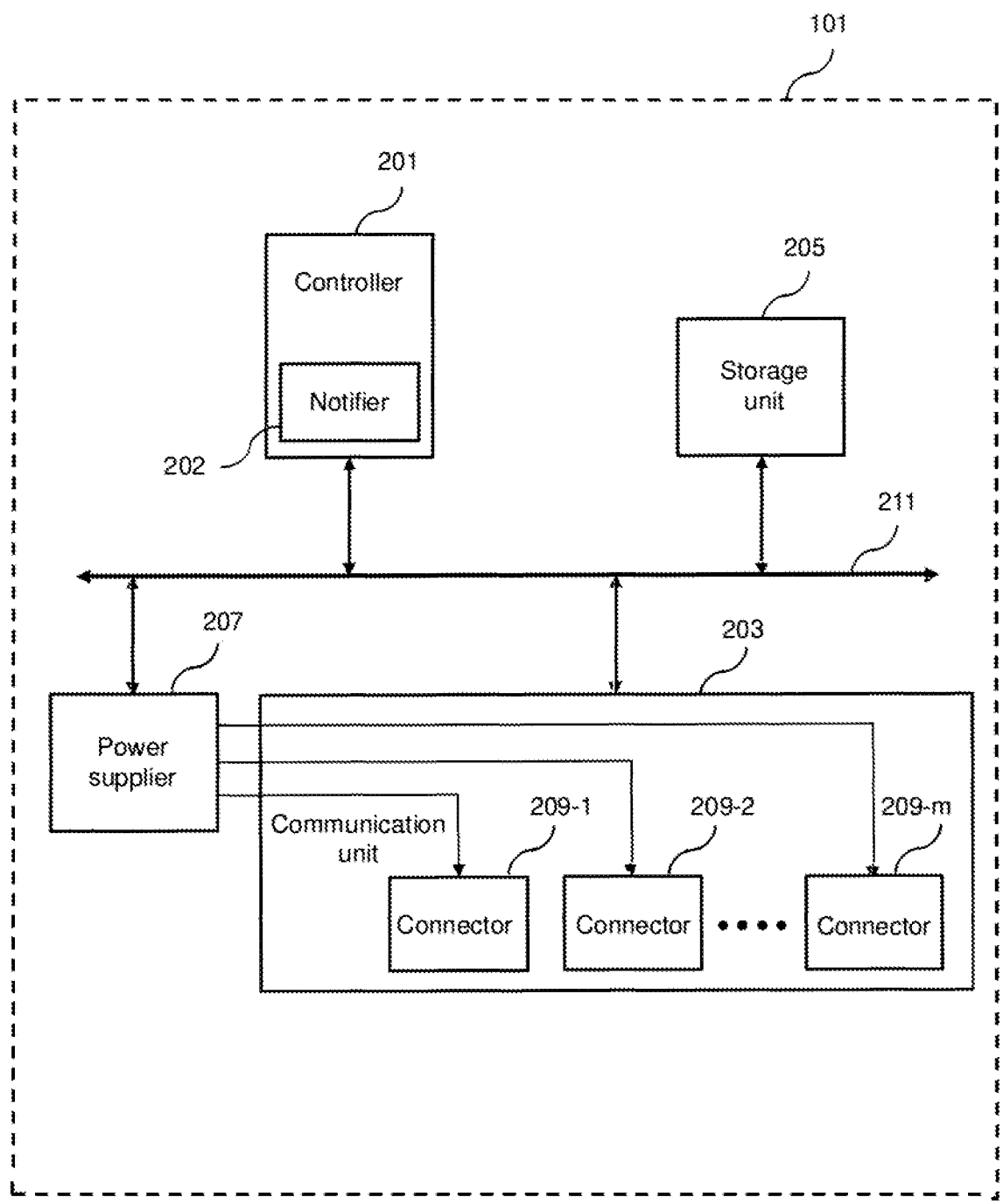
FIG. 2 is a block diagram illustrating a configuration example of a power feeding device according to an embodiment of the present disclosure.

Next, the power feeding device 101 according to the present embodiment is described with reference to FIG. 2. FIG. 2 is a block diagram illustrating a configuration example of the power feeding device 101 according to the present embodiment. The power feeding device 101 may include a controller 201, a communication unit 203, a storage unit 205, a power supplier 207, and a connector(s) 209. The controller 201, the communication unit 203, the storage unit 205, and the power supplier 207 are connected to each other via a bus 211.

The controller 201 includes an arithmetic process circuit such as a CPU or the like. The controller 201 executes a program stored in the storage unit 205 by the CPU (computer) to realize a communication function and a power supply function for supplying power to the power receiving device 103. Part or all of the configurations for realizing these functions is not limited to the case where the configuration is realized by software by executing a program, and may be realized by hardware. Note that the function realized by the controller 201 includes a function of controlling each unit constituting the power feeding device 101 in addition to the above-described functions. The controller 201 controls the power supply to the power receiving device 103 connected to the power feeding device 101 based on a power supply schedule described later.

The controller 201 includes a notifier 202. The notifier 202 generates and notifies the power receiving device 103 that receives the power supply from the power feeding device 101 of the preliminary notification of power supply stopping for notifying announcing a power supply stopping. The preliminary notification is generated and notified based on the power supply schedule and a notification schedule, which is described later. The preliminary notification is notified for each of the power receiving devices 103 connected to the power feeding device 101.

The notifier 202 notifies each of the power receiving devices 103 of the preliminary notification of power supply stopping at a predetermined timing before the timing of power supply stopping (power supply stopping time) of each of the power receiving devices 103. The timing at which the preliminary notification of power supply stopping is notified may be the same for each power receiving device 103 connected to the power feeding device 101 or may be different. For example, the notifier 202 may notify the power receiving devices 103-1~103-n of the preliminary notification of power supply stopping 90 seconds before the power supply stopping time corresponding to each of the power receiving devices 103-1~103-n. Further, the notifier 202 may notify the power receiving device 103-1 of the preliminary notification of power supply stopping 90 seconds before the power supply stopping time of the power receiving device 103-1, and notify the power receiving device 103-2 of the preliminary notification of power supply stopping 60 seconds before the power supply stopping time of the power receiving device 103-2.

The preliminary notification may include information indicating a remaining time until the power supply stopping. The controller 201 can calculate the remaining time until the power supply stopping based on the power supply schedule.

The notifier 202 may notify each of the power receiving devices 103 of the preliminary notification of power supply stopping a plurality of times. In a case where the preliminary notification of power supply stopping is notified a plurality of times, the notifier 202 may notify the corresponding power receiving device 103 of the preliminary notification at a fixed cycle. In this case, the preliminary notification may be stored in LLDP (Link Layer Discovery Protocol) and notified to the power receiving device 103. Further, in a case where the preliminary notification of power supply stopping is notified a plurality of times and the preliminary notification includes information indicating the remaining time until the power supply stopping, the remaining time until the power supply stopping is the remaining time from each timing when the preliminary notification is notified to the power supply stopping timing (power supply stopping time).

In a case where receiving an update request of the power supply stopping time (power supply stopping timing) from the power receiving device 103, the controller 201 may update the timing of the power supply stopping to the power receiving device 103. That is, the controller 201 may extend the power supply stopping time to the power receiving device 103. The controller 201 may extend the power supply stopping time for a predetermined time set in advance. The notifier 202 generates a new preliminary notification of power supply stopping in response to the update request of the power supply stopping time, and notifies the power receiving device 103 of the preliminary notification.

The communication unit 203 is an interface, which is connected to an external device (the power receiving device 103, the router (not shown), an L3 switch (not shown), or the like) under the control of the controller 201, and transmits/receives data under the control of the controller 201. In addition, the communication unit 203 performs process of data to be transmitted to an external device, including packetization of data.

The communication unit 203 includes connectors 209-1~209-*m* (m is a natural number). In the following description, each of the connectors is simply referred to as a "connector 209" when there is no need to distinguish between them. The connector 209 is an interface that connects the power supplier 207 and a connector 309 of the power receiving device 103, which is described later. In the present embodiment, the connector 209 and the power receiving device 103 are connected via the LAN cable. The connector 209 supplies the power supplied from the power supplier 207 to the power receiving device 103. In addition, the connector 209 transmits the preliminary notification of power supply stopping to the power receiving device 103.

The storage unit 205 is a storage device such as a nonvolatile memory, a hard disk or the like. As the storage unit 205, in addition to a semiconductor memory such as an SSD (Solid State Drive), a magnetic recording medium (a magnetic tape, a magnetic disk, or the like), an optical recording medium, a magneto-optical recording medium, or elements that can be storage mediums are used. The storage unit 205 has a function as a database for storing an application program for realizing a communication function and a power supply function, various kinds of information, and the like. The application program may be downloaded via a network. Further, the storage unit 205 may be externally present.

The storage unit 205 may be connected to the power feeding device 101 and may store a power supply schedule that predetermines a power supply starting/stopping time to the power receiving device 103 that receives the power supply from the power feeding device 101. The power supply schedule can be set for each power receiving device 103 connected to the power feeding device 101. Further, the power supply schedule may be appropriately changed by a user. An example of the power supply schedule is shown in Table 1 below.

TABLE 1

|  | Power supply stopping time | Power supply starting time |
| --- | --- | --- |
| Power receiving device 103-1 | 10:00 PM | 5:00 AM |
| Power receiving device 103-2 | 0:00 AM | 6:00 AM |
| . . . | . . . | . . . |
| Power receiving device 103-n | 2:00 AM | 8:00 AM |

As shown in Table 1, the power receiving device 103-1 may be scheduled so that the power supply from the power feeding device 101 is stopped at 10:00 PM and the power supply is started (resumed) at 5 AM. Similarly, the power receiving device 103-2 may be scheduled so that the power supply from the power feeding device 101 is stopped at 0:00 AM and the power supply is started (resumed) at 6:00 AM, and the power receiving device 103-*n* may be scheduled so that the power supply from the power feeding device 101 is stopped at 2:00 AM and the power supply is started (resumed) at 8:00 AM. The power supply schedule is not limited to the data table shown in Table 1. For example, the power supply starting time may be set after a predetermined time has elapsed from the power supply stopping time.

In addition, the storage unit 205 may store a notification schedule that predetermines a timing for notifying the power receiving device 103 of the preliminary notification of power supply stopping and the number of times of notification. The notification schedule can be set for each power receiving device 103 connected to the power feeding device 101. The notification schedule may be changed as appropriate by a user. An example of the notification schedule is shown below.

TABLE 2

|  | Notification timing | Number of notifications |
| --- | --- | --- |
| Power receiving device 103-1 | 10 minutes before the power supply stopping | 30 times (per 20 seconds) |
| Power receiving device 103-2 | 10 minutes before the power supply stopping | once |
| . . . | . . . | . . . |
| Power receiving device 103-n | 20 minutes before the power supply stopping | 40 times (per 30 seconds) |

The power supplier 207 supplies power to the power receiving device 103 via the connector 209 under the control of the controller 201. The power supplier 207 supplies power to the power receiving device 103 for each port.

The power supplier 207 may be an IC that controls on/off of the PoE power supply in accordance with a rule defined in the PoE standard. The power supplier 207 controls starting/stopping of the power supply to the power receiving device 103 based on control by the controller 201. The power supplied to the power supplier 207 is supplied from the outside. The source of the power supplied to the power feeding device 101 is not particularly limited, and may be an input from a DC power supply, an input from an AC power supply, or an input from another power feeding device. The controller 201 stops the power supply from the power supplier 207 to the power receiving device 103 after a predetermined time has elapsed since the preliminary notification of power supply stopping is notified to the power receiving device 103.

In the power supply schedule, in a case where the resume of the power supply from the power feeding device 101 to the predetermined power receiving device 103 is set after a predetermined time has elapsed from the power supply stopping, the controller 201 may resume the power supply from the power supplier 207 to the predetermined power receiving device 103 via a connector 209 corresponding to the predetermined power supply device 103 at the set time based on the power supply schedule.

The power feeding device 101 may further include an operation unit (not shown) and a display unit (not shown). The operation unit outputs a signal corresponding to an operation input by the user by an operation button or the like to the controller 201. The operation button includes, for example, a power switch, a cursor key, and the like, and is an operator that receives an instruction from the user. The display unit is a display device such as a liquid crystal display, an OLED display and the like, and displays a screen based on the control of the controller 201.

<Power Receiving Device>

The power receiving device 103 according to the present embodiment is described with reference to FIG. 3. As described above, in the present embodiment, the power receiving device 103 is an access point (AP). In the present embodiment, the power receiving device 103 is a network device which is wired or wirelessly connected via a network to the power feeding device 101 that is the L2 switch and a communication terminal (not shown) connected to the power receiving device 103. The power receiving device 103 has a function of relaying the communication terminal (not shown) and a power feeding device 101, which is the L2 switch.

Figure 3:
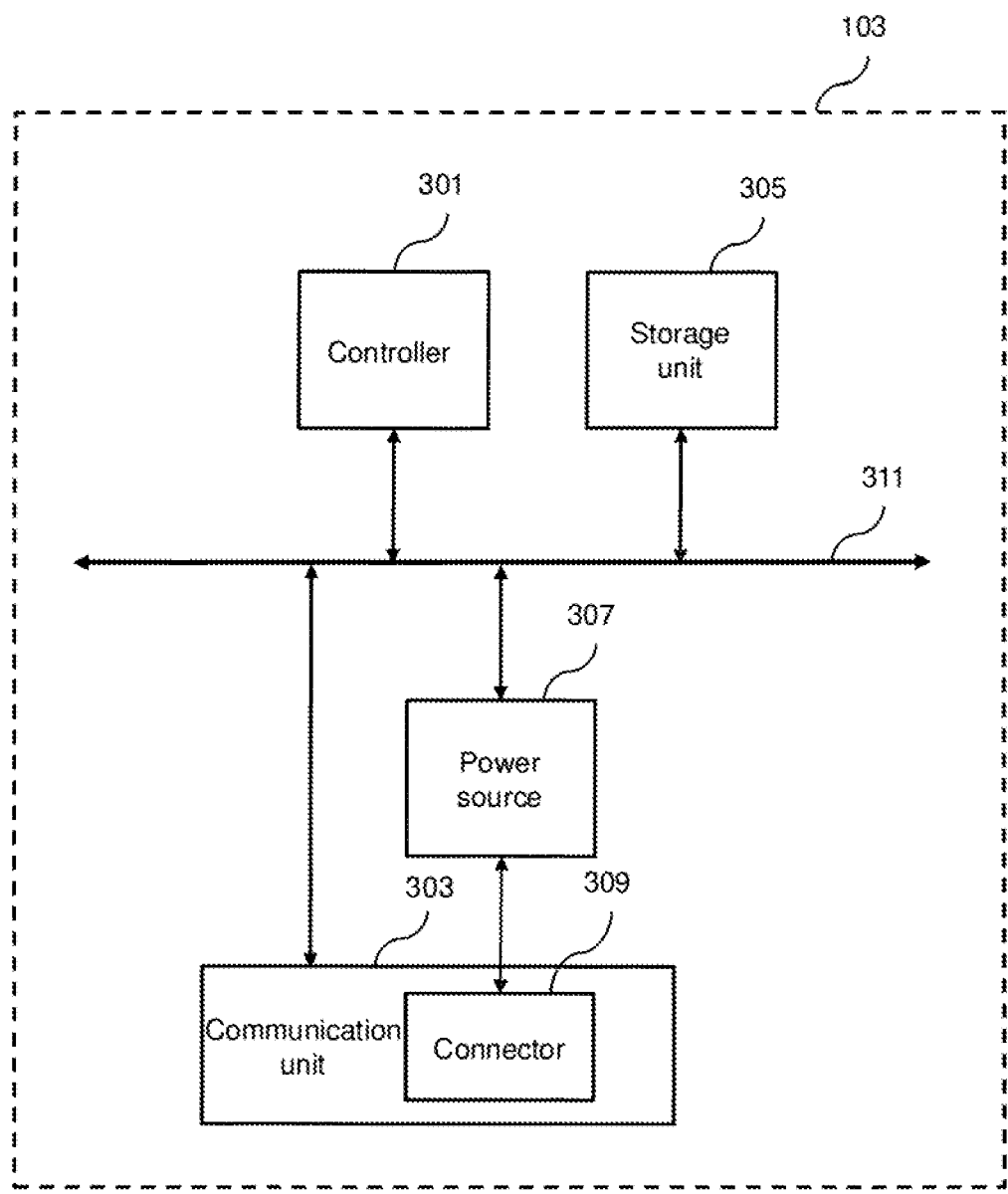
FIG. 3 is a block diagram illustrating a configuration example of a power receiving device according to an embodiment of the present disclosure.

FIG. 3 is a block diagram illustrating a configuration example of the power receiving device according to the present embodiment. The power receiving device 103 may include a controller 301, a communication unit 303, a storage unit 305, and a power source 307. The controller 301, the communication unit 303, the storage unit 305, and the power source 307 are connected to each other via a bus 311.

The controller 301 includes an arithmetic process circuit such as a CPU. The controller 301 executes a program stored in the storage unit 305 by a CPU (computer) to realize various functions executed by the power receiving device 103, such as a communication function and the like. In addition, the controller 301 is not limited to a case where a part or all of a configuration for realizing these functions is realized by software by executing a program, and may be realized by hardware. Note that the function realized by the controller 301 includes a function of controlling each unit constituting the power receiving device 103 in addition to the above-described functions.

The controller 301 acquires the preliminary notification of power supply stopping announcing the power supply stopping from the power feeding device 101 via the connector 309, which is described later. The controller 301 executes a predetermined process based on the preliminary notification by the power supply stopping timing (power supply stopping time). The power supply stopping time at which the power supply from the power feeding device 101 is stopped is specified based on the preliminary notification.

In a case where the preliminary notification includes information indicating the remaining time until the power supply stopping, the controller 301 can specify the power supply stopping time based on the timing at which the preliminary notification is notified and the remaining time until the power supply stopping. In a case where the preliminary notification does not include the information indicating the remaining time until the power supply stopping, the controller 301 may specify the power supply stopping time based on the identification information such as the IP address of the power feeding device 101 that has notified the preliminary notification. For example, the power receiving device 103 may store a data table associating identification information of the power feeding device 101 and the remaining time from the timing at which the preliminary notification is notified from the power feeding device 101 to the timing of the power supply stopping in the storage unit 305 in advance. The power receiving device 103 may store identification information and the remaining time from the timing at which the preliminary notification is notified to the timing of the power supply stopping for each of one or more power feeding devices 101. In addition, in the case where the preliminary notification does not include information indicating the remaining time until the power supply stopping, the controller 301 may inquire of the power feeding device 101 that has notified the preliminary notification about power supply stopping time.

When the controller 301 acquires the preliminary notification of power supply stopping announcing the power supply stopping from the power feeding device 101, the controller 301 may measure the remaining time until the power supply stopping time at which the power supply from the power feeding device 101 is stopped. In other words, the controller 301 may count down the remaining time until the power supply stopping time.

The predetermined process executed by the controller 301 until the power supply stopping time from the power feeding device 101 includes at least one from among saving of the system log inside the power receiving device 103 and saving of a configuration file.

In a case where the power receiving device 103 functioning as an access point is connected to an external device such as a communication terminal (not shown), the controller 301 transmits a connection destination change request requesting the connected external device to change the connection destination via the communication unit 303 before the timing when the power supply from the power feeding device 101 is stopped. In addition, the controller 301 stops acceptance of new access from the external device.

Additionally, in a case where the power receiving device 103 notified of the preliminary notification of power supply stopping from the power feeding device 101 is the controller access point (controller AP), the power receiving device 103 notified of the preliminary notification executes at least one from among notifying the other power receiving device 103 connected to the same power feeding device 101 of the power supply stopping and transferring its controller authority to the other power receiving device 103 before the power supply stopping. Here, the controller AP means an access point that can collectively set and manage other member access points (member APs) connected to the same power feeding device 101. That is, the controller AP provides a virtual controller function to other member APs.

For example, it is assumed that the power receiving device 103-1 in FIG. 1 is a controller AP, and other power receiving devices 103-2~103-$n$ connected to the same power feeding device 101 are member APs. When the power receiving device 103-1 is notified of the preliminary notification of power supply stopping from the power feeding device 101, the power receiving device 103-1 may notify the other power receiving devices 103-2~103-$n$ that the power supply will stop to the power receiving device 103-1 from the power feeding device 101. Upon receiving the notification, the power receiving devices 103-2~103-$n$ may select a next controller AP. For example, in a case where the power receiving device 103-2 is selected as the next controller AP, the power receiving device 103-2 functions as the controller AP after the power supply from the power feeding device 101 to the power receiving device 103-1 is stopped.

In addition, when the power receiving device 103-1, which is the controller AP, is notified of the preliminary notification of power supply stopping from the power feeding device 101, the power receiving device 103-1 may transfer the controller authority to any one of the other power receiving devices 103-2~103-$n$. The power receiving device 103 to which the controller authority has been transferred from the power receiving device 103-1 functions as the controller AP after the power supply from the power feeding device 101 to the power receiving device 103-1 is stopped. In this case, the power receiving device 103 to which the controller authority is transferred may be selected in advance from the power receiving devices 103-2~103-$n$. For example, priorities of the power receiving devices 103 functioning as the next controller AP may be determined among the power receiving devices 103-2~103-$n$.

The notification of stopping the power supply from the power receiving device 103-1 to the other power receiving devices 103-2~103-$n$ and the transfer of the controller authority may be performed by radio communication between the power receiving devices 103 via the communication unit 303 described later, or may be performed by wire communication via the power feeding device 101. In addition, the power feeding device 101 may notify the power receiving devices 103-2~103-$n$ of the power supply stopping to the power receiving device 103-1 or transfer the control authority based on the power supply schedule.

In a case where the predetermined process is not completed by the power supply stopping time, the controller 301 can request the power feeding device 101 to update the power supply stopping time one or more times. When a new preliminary notification of the power supply stopping is notified from the power feeding device 101 based on the update request of the power supply stopping time, the controller 301 completes the predetermined process by the power supply stopping time specified on the basis of the new preliminary notification.

The communication section 303 is wired or wirelessly connected to external devices (such as the power feeding device 101, a communication terminal (not shown), etc.). The communication unit 303 is an interface for transmitting and receiving data under the control of the controller 301.

The communication unit 303 includes the connector 309. The connector 309 is an interface connecting the power source 307 and the connector 209 of the power feeding device 101. In the present embodiment, the connector 309 and the power feeding device 101 are connected via the LAN cable. The connector 309 supplies power supplied from the power feeding device 101 to the power source 307 described later. In addition, the connector 309 receives the preliminary notification announcing the stop of the power supply from the power feeding device 101, and transmits the preliminary notification to the controller 301.

The communication unit 303 may wirelessly communicate with the power feeding device 101, the other power receiving device 103, or an external communication terminal (not shown). In this case, as the communication unit 303, for example, a communication module capable of performing communication using a radio LAN, a Bluetooth (registered trademark), or the like is used.

The storage unit 305 is a storage device such as the nonvolatile memory, the hard disk, and the like. As the storage unit 305, in addition to the semiconductor memory such as an SSD (Solid State Drive), the magnetic recording medium (a magnetic tape, a magnetic disk, or the like), the optical recording medium, the magneto-optical recording medium, or elements that can be storage mediums are used. The storage unit 305 has a function as a database that stores application programs for realizing various functions executed by the power receiving device 103, such as a communication function, and various kinds of information. The application program may be downloaded via a network.

The power source 307 receives power from the power feeding device 101 connected via the connector 309, and functions as a power source for the power receiving device 103. The connector 309 is the interface that connects the power source 307 and the power feeding device 101.

The power receiving device 103 may acquire the preliminary notification of power supply stopping from the power feeding device 101 a plurality of times from the power feeding device 101. The preliminary notification of power supply stopping may include information indicating the remaining time until the power supply stopping. In the case where information indicating the remaining time until the power supply stopping is included in the preliminary notification of power supply stopping, the controller 301 does not need to measure the remaining time until the power supply stopping time (power supply stopping timing).

In the communication system 10 according to the present embodiment, the power feeding device 101 notifies the power receiving device 103 that receives the power supply from the power feeding device 101 of the preliminary notification of power supply stopping based on the preset power supply schedule. When the power receiving device 103 acquires the preliminary notification of power supply stopping from the power feeding device 101 via the connector 309, the power receiving device 103 can specify the power supply stopping time (power supply stopping timing) at which the power supply from the power feeding device 101 is stopped based on the preliminary notification. The power receiving device 103 executes process such as saving of an unsaved log or data file, a request for changing the connection destination to an external device, and a stopping of acceptance of a new access from the external device by the power supply stopping time.

Since the power receiving device 103 can execute process necessary before shutdown, it is possible to prevent a trouble that may occur when power supply from the power feeding device 101 is resumed and the power receiving device 103 is restarted. In a case where an external device such as a communication terminal is connected to the power receiving device 103, it is possible to prevent a communication trouble by changing the connection destination to other access point in advance before the power receiving device 103 is shut down in response to a request for changing the connection destination. Further, since the power receiving device 103 stops accepting the new access from the external device before shutdown, the external device can avoid connection with the power receiving device 103 in which the shutdown time (power supply stopping time) is approaching in advance. In addition, in the case the power receiving device 103 that is scheduled to stop the power supply functions as the controller AP, by transferring the controller authority to the other power receiving device 103 in advance, the other power receiving device 103 can quickly function as the controller AP after the power supply stopping.

<Power Supply Stopping Process>

A process of stopping the power supply from the power feeding device 101 to the power receiving device 103 based on the power supply schedule is described.

Figure 4:
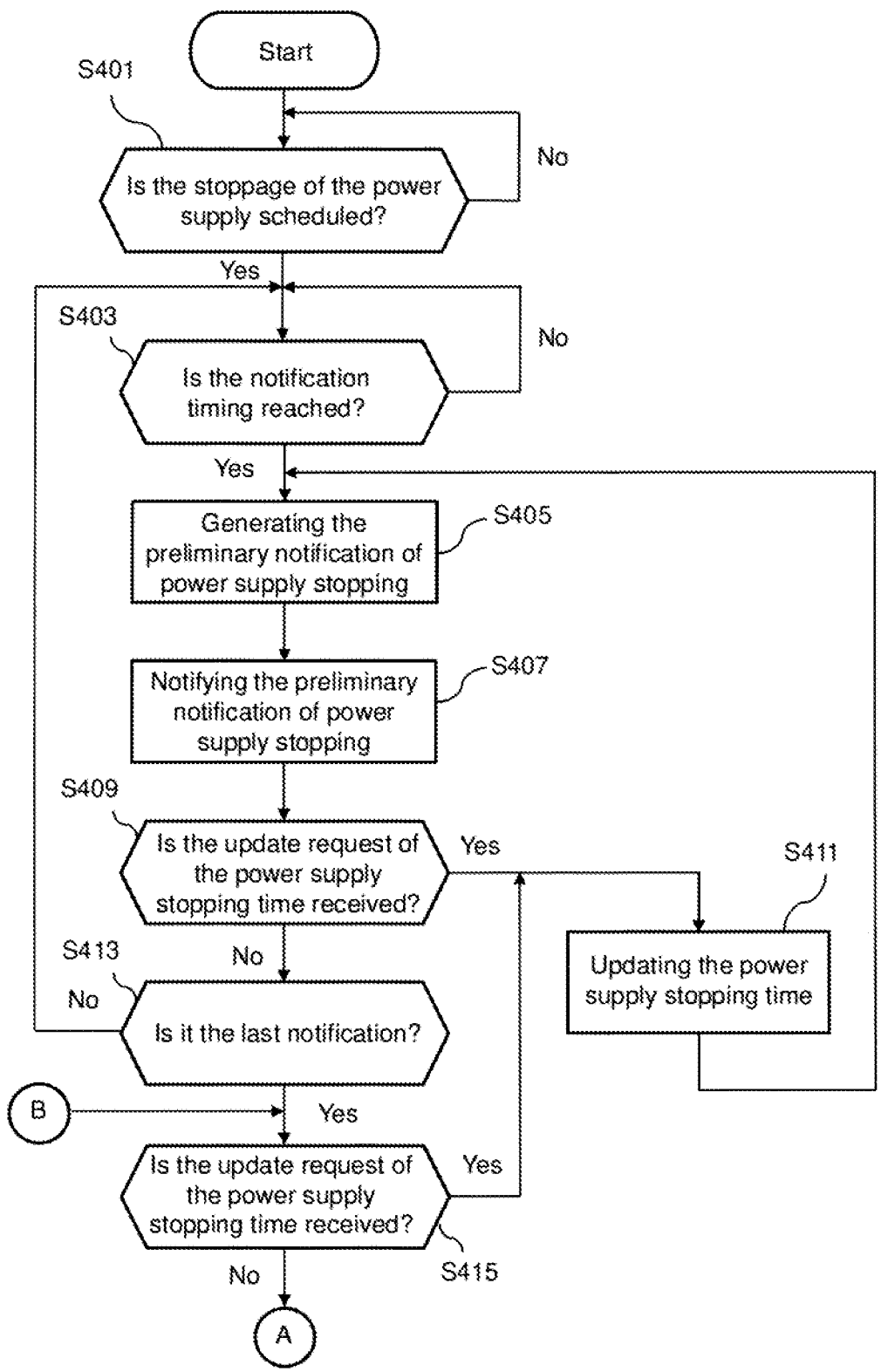
FIG. 4 is a flowchart illustrating an example of a flow of a power supply stopping process executed by a power feeding device according to an embodiment of the present disclosure.
Figure 5:
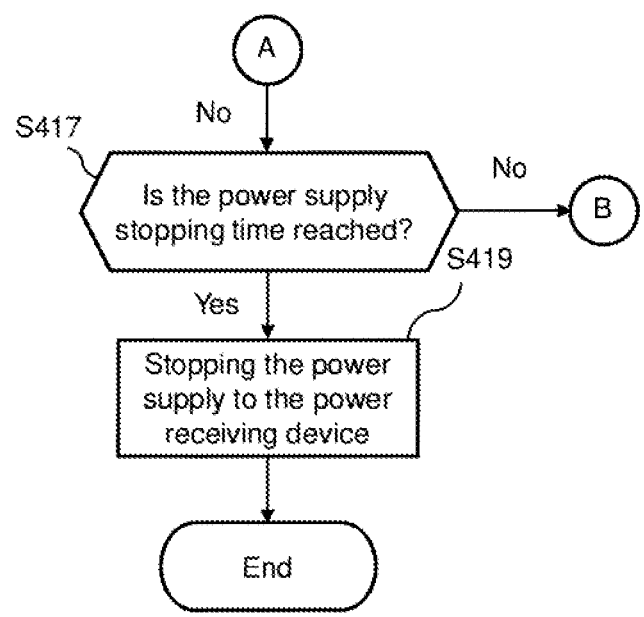
FIG. 5 is a flowchart illustrating an example of a flow of a power supply stopping process executed by a power feeding device according to an embodiment of the present disclosure.

FIG. 4 and FIG. 5 are flow diagrams illustrating an example of a flow of process executed by the power feeding device 101 according to the embodiment of the present invention.

First, in the power feeding device 101, the controller 201 determines whether or not the power supply to the power receiving device 103 is scheduled to be stopped based on the power supply schedule (S401). If not scheduled (S401; No), the controller 201 repeats S401 process.

In a case where the power supply stopping is scheduled (S401; Yes), the controller 201 determines whether or not the notification timing of a preliminary notification has been reached based on the notification schedule (S403). In a case where the notification timing has not been reached (S403; No), the controller 201 repeats S403 process. In a case where the notification timing is reached (S403; Yes), the notifier 202 generates the preliminary notification (S405). The controller 201 notifies (transmits) the power receiving device 103 via the connector 209 the generated preliminary notification (S407).

The controller 201 determines whether or not the update request of the power supply stopping time has been received from the power receiving device 103 (S409). In a case where the update request of the power supply stopping time is received from the power receiving device 103 (S409; Yes), the controller 201 updates the power supply stopping time for the power receiving device 103 (the power supply stopping timing to the power receiving device 103) (S411). When the power supply stopping time is updated, the controller 201 returns to S405 process, and generates a preliminary notification of power supply stopping based on an updated power supply stopping time.

In a case where the update request of the power supply stopping time has not been received from the power receiving device 103 (S409; No), the controller 201 determines whether or not the preliminary notification notified (transmitted) to the power receiving device 103 is the last notification based on the notification schedule (S413). In a case where the preliminary notification notified (transmitted) to the power receiving device 103 is not the last notification (S413; No), the controller 201 returns to S403 process.

In a case where the preliminary notification notified (transmitted) to the power receiving device 103 is the last notification (S413; Yes), the controller 201 determines again whether or not the update request of the power supply stopping time has been received from the power receiving device 103 (S415). In a case where the update request of the power supply stopping time has been received from the power receiving device 103 (S415; Yes), the process proceeds to S411 process. In a case where the update request of the power supply stopping time has not been received from the power receiving device 103 (S415; No), the controller 201 determine whether or not the power supply stopping time of the power receiving device 103 has been reached (S417). In a case where the power supply stopping time of the power receiving device 103 is reached (S417; Yes), the controller 201 stops the power supply to the power receiving device 103 via the power supplier 207 (S419), and ends the series of processes. On the other hand, in a case where the power supply stopping time of the power receiving device 103 has not been reached (S417: No), the controller 201 returns to S415 process.

Figure 6:
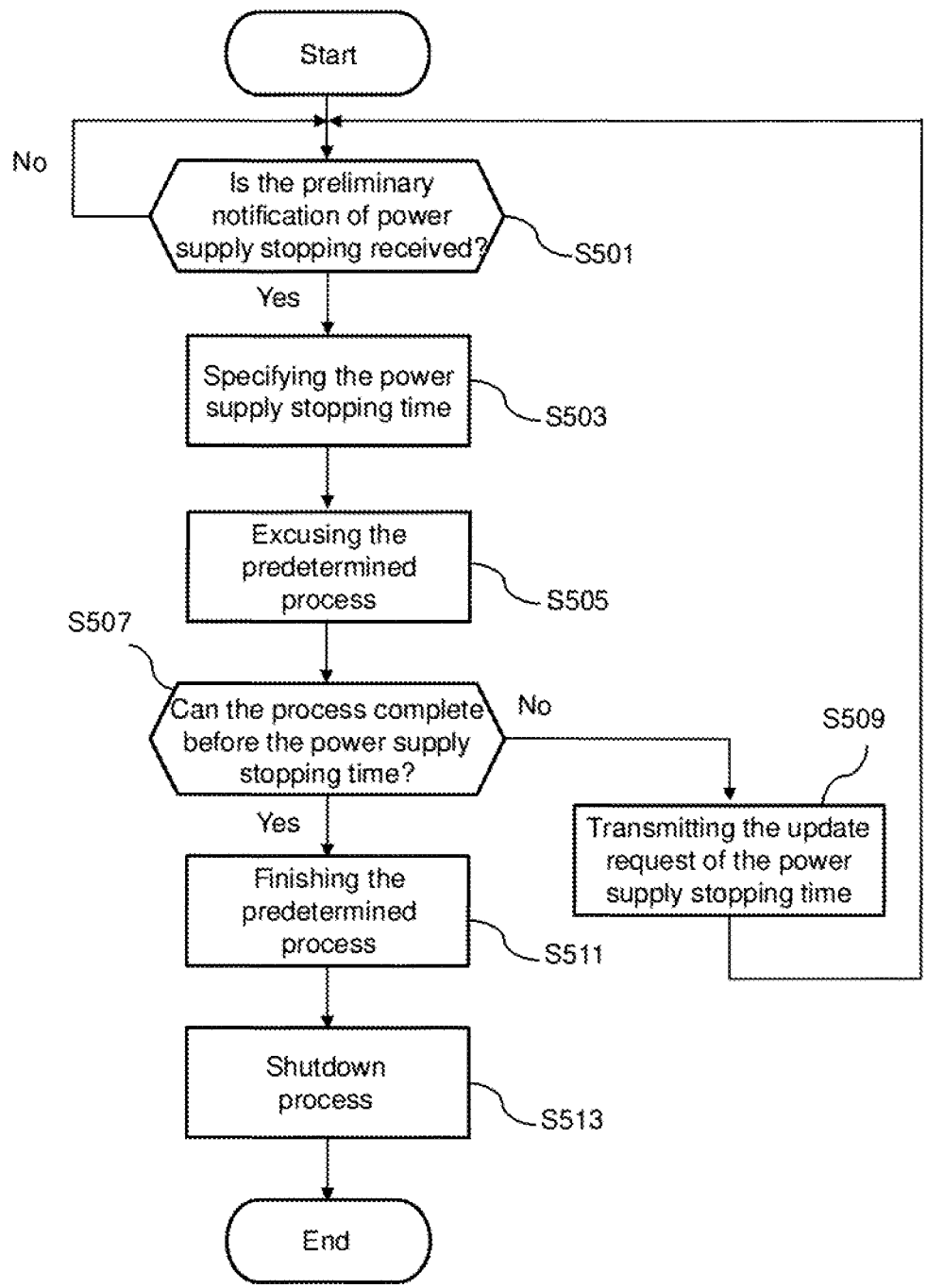
FIG. 6 is a flowchart illustrating an example of a flow of a power supply stopping process executed by a power receiving device according to an embodiment of the present disclosure.

FIG. 6 is a flowchart illustrating an example of a flow of process executed by a power receiving device 103 according to an embodiment of the present invention.

The controller 301 of the power receiving device 103 determines whether or not the preliminary notification for announcing a stoppage of the power supply from the power feeding device 101 has been acquired via the connector 309 (S501). In a case where the preliminary notification has not been acquired (S501; No), the controller 301 repeats S501 process. In a case where the preliminary notification is acquired (S501; Yes), the controller 301 specifies the power supply stopping time (power supply stopping timing) at which the power supply from the power feeding device 101 is stopped based on the preliminary notification (S503), and executes a predetermined process (S505). Here, the start of the execution of the predetermined process (S505) may be concurrent with the identification of the power supply stopping time (S503), or may be prior to the identification of the power supply stopping time (S503).

The controller 301 determines whether or not the predetermined process being executed can be completed before the power supply stopping time (S507). In a case where it is determined that the predetermined process can be completed before the power supply stopping time (S507; Yes), the controller 301 continues to execute the predetermined process and completes the predetermined process (S511). After completion of the predetermined process, the controller 301 performs a shutdown process of the power receiving device 103 (S513), and ends the series of processes.

On the other hand, in a case where it is determined that the predetermined process cannot be completed before the power supply stopping time (S507; No), the controller 301 generates an update request for requesting the power feeding device 101 to update the power supply stopping time, and transmits the generated update request to the power feeding device 101 (S509). The update request is transmitted to the power feeding device 101 via the connector 309. After the updating request is transmitted, the controller 301 returns to S501 process.

Second Embodiment

A communication system according to a second embodiment of the present disclosure is described in detail with reference to the drawings.

Figure 7:
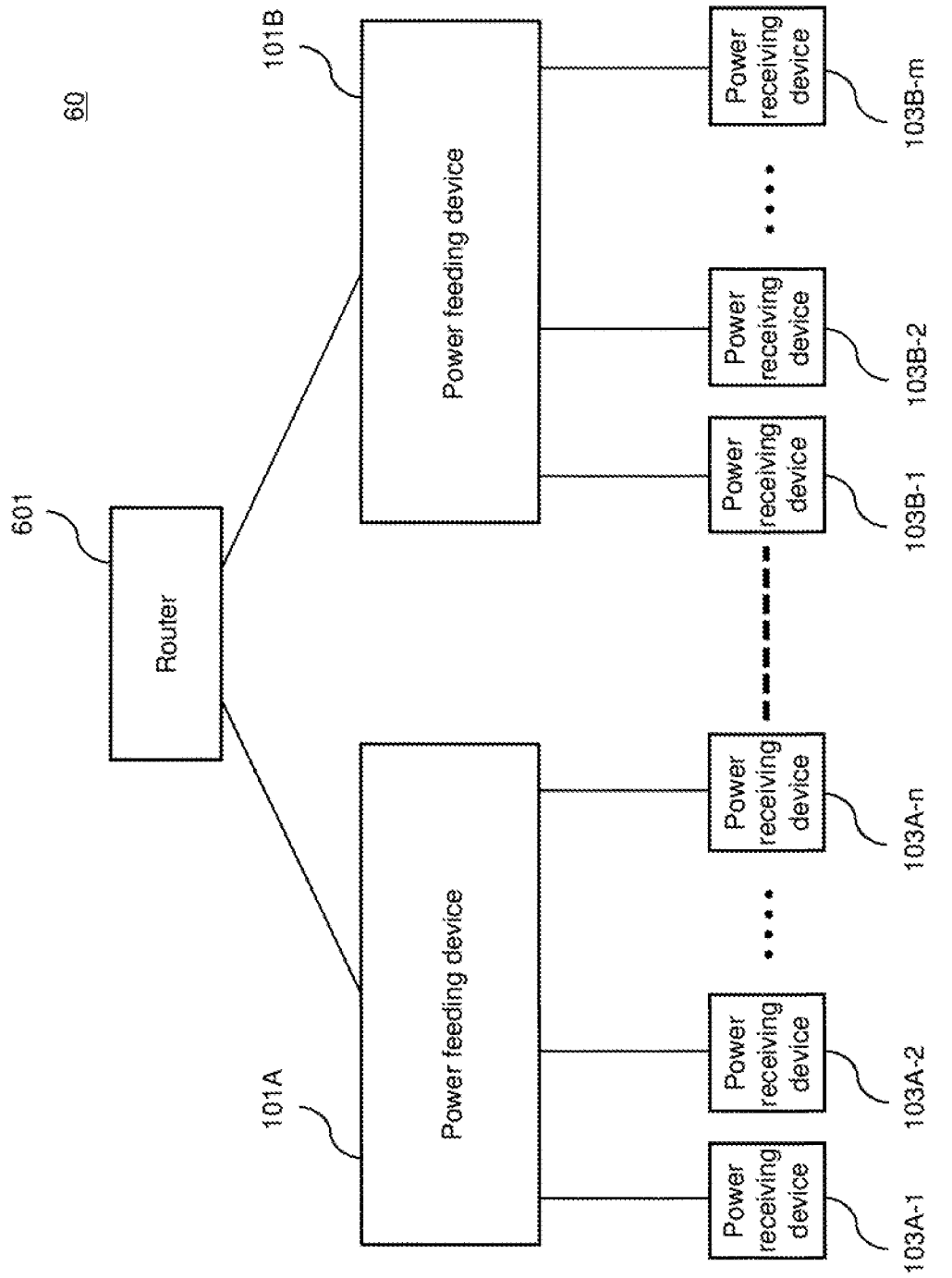
FIG. 7 is a schematic diagram illustrating a configuration example of a communication system according to another embodiment of the present disclosure.

FIG. 7 is a schematic diagram illustrating a configuration example of a communication system 60 according to the second embodiment of the present disclosure. The communication system 60 includes a first power feeding device 101A, first power receiving devices 103A-1~103A-n (n is a natural number), a second power feeding device 101B, and second power receiving devices 103B-1~103B-m (m is a natural number).

The first power feeding device 101A and the second power feeding device 101B are PoE-capable PSEs, similarly to the power feeding device 101 in the first embodiment. In the present embodiment, the first power feeding device 101A and the second power feeding device 101B are both layer 2 (L2) switches. Since configurations of the first power feeding device 101A and the second power feeding device 101B are the same as the configuration of the power feeding device 101 in the first embodiment, detailed explanation thereof is omitted.

The first power feeding device 101A and the second power feeding device 101B are connected to each other via an external device (such as a router (not shown), an L3 switch (not shown), a server (not shown), and the like). In this embodiment, the first power feeding device 101A and the second power feeding device 101B are connected to each other via a router 601.

The first power receiving devices 103A-1~103A-n (n is a natural number) and the second power receiving devices 103B-1~103B-m (m is a natural number) are PoE-capable PDs (Powered Device) as in the power receiving device 103 of the first embodiment. In the present embodiment, the first power receiving devices 103A-1~103A-n and the second power receiving devices 103B-1~103B-m are access points (APs).

The first power receiving devices 103A-1~103A-n (n is a natural number) are connected to the first power feeding device 101A via the PoE-capable LAN-cable. Each of the first power receiving devices 103A-1~103A-n performs data communication with the first power feeding device 101A and receives power from the first power feeding device 101A. Each of the first power receiving devices 103A-1~103A-n are simply referred to as a "first power receiving device 103A" when there is no need to distinguish between them.

The second power receiving devices 103B-1~103B-m are connected to the second power feeding device 101B via the PoE-capable LAN-cable. Each of the second power receiving devices 103B-1~103B-m performs data communication with the second power feeding device 101B and receives power from the second power feeding device 101B. Each of the second power receiving devices 103B-1~103B-m are simply referred to as a "second power receiving device 103B" when there is no need to distinguish between them.

In the present embodiment, the first power receiving device 103A connected to the first power feeding device 101A and the second power receiving device 103B connected to the second power feeding device 101B are connected via the router 601. One of the first power receiving device(s) 103A and the second power receiving device(s) 103B functions as the controller AP, and the other power receiving devices serving as the member AP, are collectively set and managed by the controller AP.

In the first embodiment, it has been described that, in the case where the predetermined power receiving device 103, which is the controller AP, of the power receiving devices 103 that receive power supply from the power feeding device 101 receives the preliminary notification announcing the power supply stopping, the power receiving device 103 that has received the preliminary notification executes at least one from among the notifying the power supply stopping to other power receiving devices (member APs) that are connected to the same power feeding device 101 and transferring its controller authority to another power receiving device 103.

However, in a case where a predetermined power receiving device, which is the controller AP, receives the preliminary notification announcing the power supply stopping, the notification of power supply stopping to other power receiving devices (member APs) and the transfer of the controller authority to another power receiving device (member AP) are not limited to the power receiving device(s) connected to the same power feeding device 101.

In the present embodiment, in a case where the first power receiving device 103A, which is the controller AP, receives the preliminary notification announcing the stoppage of the power supply from the first power feeding device 101A, the first power receiving device 103A that has received the preliminary notification may execute at least one from among the notification of power supply stopping and its own controller authority to the second power receiving devices 103B-1~103B-m that receives the power supply from the second power feeding device 101B.

Upon receiving the notification, the second power receiving devices 103B-1~103B-*m* may select the following controller AP. For example, in a case where the second power receiving device 103B-1 is selected as the following controller AP, the second power receiving device 103B-1 functions as the controller AP after the power supply from the first power feeding device 101A to the first power receiving device 103A-1 is stopped.

The first power receiving device 103A-1 may transfer the controller authority to any one of the second power receiving devices 103B-1~103B-m when the first power receiving device 103A-1, which is the controller AP, is notified from the first power feeding device 101A of the preliminary notification of power supply stopping. The second power receiving device 103B to which the controller authority has been transferred from the first power receiving device 103A-1 functions as the controller AP after the power supply from the first power feeding device 101A to the first power receiving device 103A-1 is stopped. In this case, the second power receiving device 103B to which the controller authority is transferred may be selected in advance from the second power receiving devices 103B-1~103B-m.

As described above, by transferring the controller authority to the other power receiving device 103 in advance before the power supply to the power receiving device 103 functioning as the controller AP is stopped, the other power receiving device 103 can quickly function as the controller AP after the power supply stopping.

The notification of power supply stopping and the transfer of the controller authority from the first power receiving device 103A-1 to the second power receiving devices 103B-1~103B-*m* may be performed by the radio communication, or may be performed by communication via the first power feeding device 101A, the router 601, and the second power feeding device 101B.

[Modifications]

In each of the embodiments described above, the case where the power receiving device 103 is the access point (AP) has been described as an example, but the power receiving device 103 is not limited to the access point. The power receiving device 103 may be the IP camera, the IP telephone, a PoE-capable microphone, a PoE-capable speaker, or the like.

In a case where the power receiving device 103 is the IP camera, the predetermined process executed before the power supply stopping time includes storage of an unsaved log, storage of unsaved image data, and the like. In a case where the power receiving device 103 is the IP telephone, the predetermined process executed before the power supply stopping time may include the notification of power supply stopping to the user, or the like.

Further, in each of the embodiments described above, the case where the power receiving device 103 is the access point (AP) has been described as an example, but in a case where a plurality of power receiving devices 103 are provided, all the power receiving devices 103 may be the same type of device or may be different types of devices.

Each of the embodiments described above as an embodiment of the present disclosure can be appropriately combined and implemented as long as they do not conflict with each other. Further, based on the configuration shown in the embodiments, any addition, deletion, or design change of components, or any addition, omission, or change of conditions of the process, as appropriate by people skilled in the art, is also included in the scope of the invention, as long as it has the gist of the present disclosure.

It is understood that other effects which are different from the effects brought about by each of the above-described embodiments, but which are obvious from the description of this embodiment, or which can be easily predicted by people skilled in the art, are naturally brought about by an embodiment of this disclosure.

What is claimed is:

1. A power receiving device comprising:
   a connector configured to be connected to a power feeding device;
   a power source configured to receive a power supply from the power feeding device via the connector; and
   a processor configured to perform a predetermined process before power supply stopping time in response to receiving a preliminary notification of power supply stopping from the power feeding device via the connector,
   wherein the preliminary notification of power supply stopping is different from the power supply received from the power feeding device.

2. The power receiving device according to claim 1, wherein the processor is configured to receive the preliminary notification of power supply stopping from the power feeding device a plurality of times.

3. The power receiving device according to claim 1, wherein the preliminary notification of power supply stopping includes information indicating a remaining time until the power supply stopping time.

4. The power receiving device according to claim 1, wherein the processor is configured to measure a time until the power supply stopping time in response to receiving the preliminary notification of power supply stopping.

5. The power receiving device according to claim 1, wherein the power feeding device is a PoE-capable L2 switch.

6. The power receiving device according to claim 1, wherein:
   the power receiving device is a PoE-capable device; and
   the connector is configured to connect to the power feeding device via a LAN cable.

7. The power receiving device according to claim 1, wherein the predetermined process includes at least one of saving a system log or saving a configuration file.

8. The power receiving device according to claim 1, wherein the predetermined process includes at least one of stopping acceptance of new accesses from an external device connected to the power receiving device or sending a request to change a connection destination to the external device.

9. The power receiving device according to claim 1, wherein:
   the predetermined process is a process for other power receiving devices connected to the power feeding device and receiving power supply; and
   the process for the other power receiving devices includes at least one of providing a notification of power supply stopping or transferring of authority to at least one of the other power receiving devices.

10. The power receiving device according to claim 1, wherein the processor is configured to request the power feeding device to update the power supply stopping time in response to the predetermined process not being completed by the power supply stopping time.

11. A power feeding device comprising:
    one or more connectors configured to be connected to one or more power receiving devices;
    a power supplier configured to supply power to the one or more power receiving devices via the one or more connectors;
    a processor configured to:
    notify a predetermined power receiving device via the one or more connectors of a preliminary notification of power supply stopping generated based on a predetermined schedule; and
    stop supplying power from the power supplier to the predetermined power receiving device after a predetermined period of time has passed after notifying the predetermined power receiving device of the preliminary notification of power supply stopping.

12. The power feeding device according to claim 11, wherein the processor is configured to notify the preliminary notification of power supply stopping a plurality of times.

13. The power feeding device according to claim 12, wherein the processor is configured to notify the preliminary notification of power supply stopping at predetermined intervals a plurality of times.

14. The power feeding device according to claim 11, wherein the preliminary notification of power supply stopping includes information indicating a remaining time until the power supply stopping.

15. The power feeding device according to claim 11, wherein the power feeding device is a PoE-capable L2 switch.

16. The power feeding device according to claim 11, wherein the processor is configured to stop supplying power to the predetermined power receiving device based on a power supply control schedule corresponding to the predetermined power receiving device.

17. The power feeding device according to claim 11, wherein the processor is configured to update a timing of the power supply stopping to the predetermined power receiving device in response to receiving a request to update the timing of the power supply stopping from the predetermined power receiving device.

18. A communication system comprising:
    one or more power receiving devices; and
    a power feeding device connected to the one or more power receiving devices,
    wherein,
    each of the one or more power receiving devices comprises:
    a first connector configured to be connected to the power feeding device;
    a power source configured to receive a power supply from the power feeding device via the first connector; and
    a first processor configured to perform a predetermined process before a power supply stopping time in response to receiving a preliminary notification of power supply stopping from the power feeding device via the first connector and, the power feeding device comprising:
- one or more second connectors configured to be connected to the one or more power receiving devices;
- a power supplier configured to supply power to the one or more power receiving devices via the one or more second connectors;
- a second processor configured to:
  - notify a predetermined power receiving device via the one or more second connectors of the preliminary notification of power supply stopping generated based on a predetermined schedule; and
  - stop supplying power from the power supplier to the predetermined power receiving device after a predetermined period of time has passed after notifying the predetermined power receiving device of the preliminary notification of power supply stopping.

19. A method executed by a power receiving device, the power receiving device comprising a connector configured to be connected to a power feeding device, a power source configured to receive a power supply from the power feeding device via the connector and a processor configured to receive a preliminary notification of power supply stopping from the power feeding device via the connector, the preliminary notification of power supply stopping being different from the power supply received from the power feeding device, the method comprising:
- performing a predetermined process before a power supply stopping time in response to the processor receiving the preliminary notification of power supply stopping.

20. A method executed by a power feeding device, the power feeding device comprising one or more connectors configured to be connected to one or more power receiving devices, and a power supplier configured to supply power to the one or more power receiving devices via the one or more connectors, the method comprising:
- notifying a predetermined power receiving device via the one or more connectors of a preliminary notification of power supply stopping generated based on a predetermined schedule; and
- stopping supplying power from the power supplier to the predetermined power receiving device after a predetermined period of time has passed after notifying the predetermined power receiving device of the preliminary notification of power supply stopping.

\* \* \* \* \*